US011408345B2

(12) United States Patent
Erickson et al.

(10) Patent No.: US 11,408,345 B2
(45) Date of Patent: Aug. 9, 2022

(54) OIL TANK FOR GEARED TURBOFAN ENGINE

(71) Applicants: Rolls-Royce Corporation, Indianapolis, IN (US); Rolls-Royce plc, London (GB)

(72) Inventors: Isabelle Erickson, Indianapolis, IN (US); Adam L. Kempers, Indianapolis, IN (US); David Edwards, Derby (GB); John Gebhard, Fishers, IN (US); Jeremy Gallagher, Carmel, IN (US)

(73) Assignees: ROLLS-ROYCE CORPORATION, Indianapolis, IN (US); ROLLS-ROYCE PLC

( * ) Notice: Subject to any disclaimer, the term of this patent is extended or adjusted under 35 U.S.C. 154(b) by 146 days.

(21) Appl. No.: 16/555,212

(22) Filed: Aug. 29, 2019

(65) Prior Publication Data
US 2021/0062719 A1    Mar. 4, 2021

(51) Int. Cl.
| | |
|---|---|
| *F02C 7/14* | (2006.01) |
| *F01D 25/20* | (2006.01) |
| *F02C 7/32* | (2006.01) |
| *F02C 7/36* | (2006.01) |
| *F16H 57/04* | (2010.01) |
| *F16H 57/08* | (2006.01) |

(52) U.S. Cl.
CPC ............... *F02C 7/14* (2013.01); *F01D 25/20* (2013.01); *F02C 7/32* (2013.01); *F02C 7/36* (2013.01); *F05D 2260/98* (2013.01); *F16H 57/045* (2013.01); *F16H 57/0412* (2013.01); *F16H 57/0436* (2013.01); *F16H 57/08* (2013.01)

(58) Field of Classification Search
CPC ...... F02C 7/06; F02C 7/14; F02C 7/32; F02C 7/36; F01D 25/18; F01D 25/20; F05D 2260/98; F16H 57/0412; F16H 57/0436; F16H 57/045; F16H 57/08
See application file for complete search history.

(56) References Cited

U.S. PATENT DOCUMENTS

| | | | |
|---|---|---|---|
| 7,681,402 B2 * | 3/2010 | Champion | ................ F02C 7/14 60/779 |
| 9,416,729 B2 | 8/2016 | Waitkus et al. | |
| 9,849,411 B2 | 12/2017 | Sheridan | |
| 9,995,174 B2 | 6/2018 | McCune et al. | |
| 10,054,058 B2 | 8/2018 | Sheridan et al. | |

(Continued)

OTHER PUBLICATIONS

Extended European Search Report for corresponding Application No. 20188302.2 dated Jan. 21, 2021 (9 pages).

*Primary Examiner* — Loren C Edwards
(74) *Attorney, Agent, or Firm* — Crowell & Moring LLP

(57) ABSTRACT

An oil delivery system is provided that includes a tank for a gas turbine engine, where the tank is positioned radially outward from a compressor section, a combustor section, and/or a turbine section of the gas turbine engine. The tank is configured to store oil for the gas turbine engine. The oil delivery system further includes a primary lubrication system including a sump of a power gearbox, a pump, and an oil feed line. The oil feed line extends from the tank to the primary lubrication system. The oil feed line is configured to allow a flow of oil to pass from the tank to the pump and from the pump through the power gearbox to the sump of the power gearbox.

12 Claims, 6 Drawing Sheets

(56) References Cited

U.S. PATENT DOCUMENTS

| | | | |
|---|---|---|---|
| 2009/0317229 A1* | 12/2009 | Suciu | F02C 9/20 |
| | | | 415/1 |
| 2012/0103728 A1 | 5/2012 | Portlock et al. | |
| 2012/0324899 A1 | 12/2012 | DiBenedetto et al. | |
| 2013/0098058 A1* | 4/2013 | Sheridan | F02C 7/32 |
| | | | 60/783 |
| 2013/0319798 A1 | 12/2013 | Sheridan et al. | |
| 2014/0010639 A1* | 1/2014 | Snape | F01D 25/18 |
| | | | 415/177 |
| 2016/0201568 A1* | 7/2016 | Sheridan | F02C 7/36 |
| | | | 415/1 |
| 2016/0376988 A1 | 12/2016 | Sheridan | |
| 2017/0002738 A1 | 1/2017 | Sheridan | |
| 2018/0245484 A1 | 8/2018 | Davis et al. | |
| 2019/0101081 A1 | 4/2019 | Cuvillier et al. | |

\* cited by examiner

OIL TANK FOR GEARED TURBOFAN ENGINE

TECHNICAL FIELD

This disclosure relates to tanks and, in particular, to lubrication and thermal management systems for tanks.

BACKGROUND

Present lubrication and thermal management systems suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
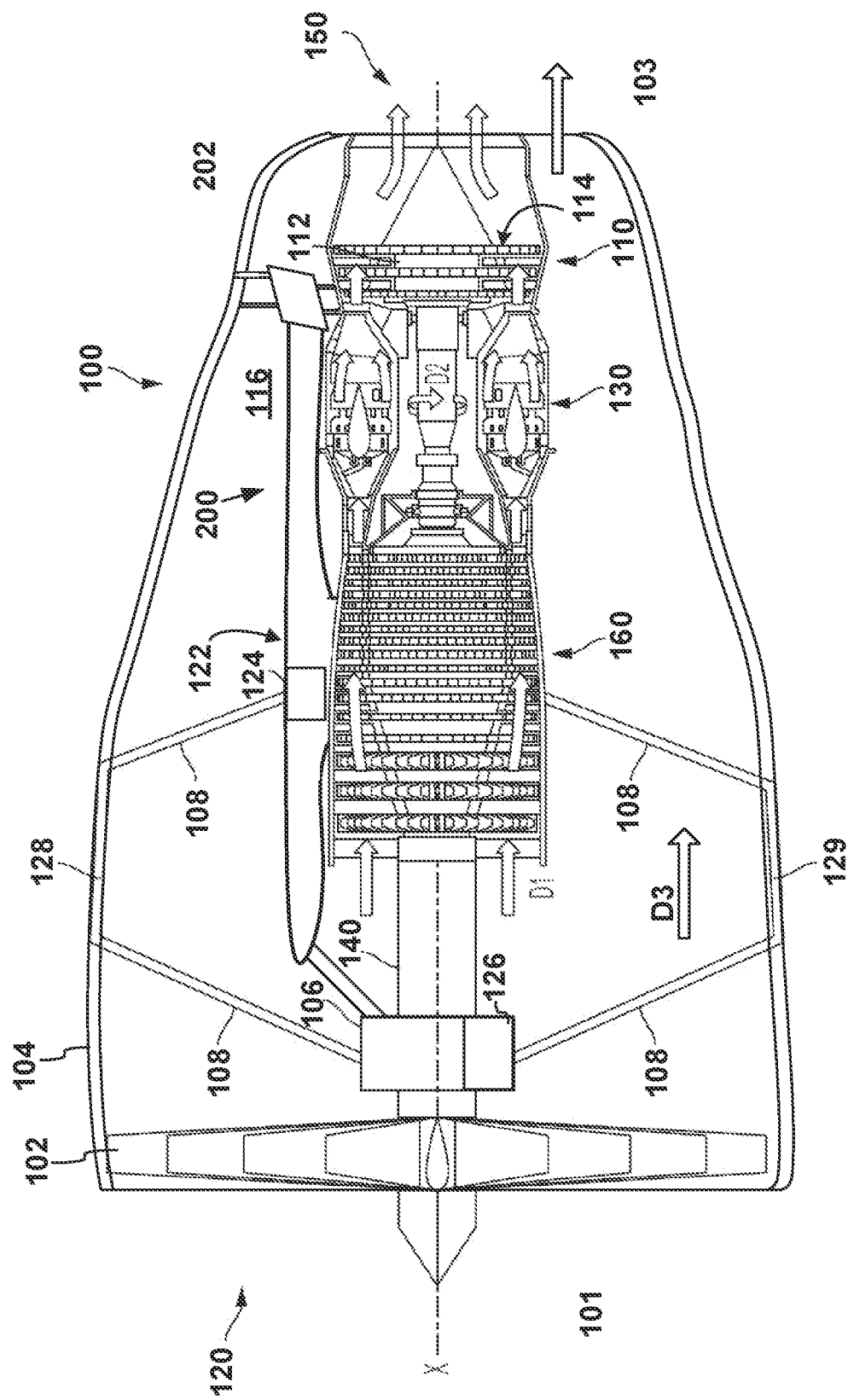
FIG. 1 illustrates a cross-sectional view of an example of a gas turbine engine.

In one example, an oil delivery system is provided including a tank for a gas turbine engine. The tank is configured to store oil for the gas turbine engine. The tank is mounted to a compressor section, a combustor section, and/or a turbine section of the gas turbine engine. The system further includes a primary lubrication system. The primary lubrication system includes a pump and an oil feed line extending from the tank to a power gearbox. The primary lubrication system may also include an oil scavenge line extending from the power gearbox to the tank. The pump is configured to pump oil from the tank through the oil feed line to the power gearbox. The pump may be further configured to pump oil from a sump of the power gearbox to the tank.

In another example, a thermal management system is provided including a tank and a mount. The mount has a first end and a second end. The tank is attached to the mount at the first end of the mount. The second end of the mount is attached to a portion of a gas turbine engine, such that the tank is positioned radially outward from a compressor section, a combustor section, and/or a turbine section of a gas turbine engine.

In yet another example a method is provided in which a primary lubrication system for a gas turbine engine is mechanically driven by an accessory gearbox. The primary lubrication system includes a pump, a sump of a power gearbox, and an oil feed line. The accessory gearbox mechanically drives the pump of the primary lubrication system. Oil is pumped from a tank to the pump with the pump. The pump causes the oil to travel through the oil feed line from the tank to the pump. The tank is positioned radially outward from a compressor section, a combustor section, and/or turbine section of the gas turbine engine. Oil is pumped from the pump through the power gearbox to the sump of the power gearbox. The power gearbox is configured to mechanically drive a fan of the gas turbine engine.

Placement of a tank in a geared turbofan engine may be difficult due to spatial limitations. In typical gas turbine engines, the tank is mounted at or toward the front of the engine. However, the relatively large radius of the fan in the geared turbofan engine limits and/or prohibits the typical practice of mounting the tank to the front of the engine. To minimize the size of the nacelle surrounding the engine and thus improve the aerodynamics of the engine, space between the fan case and the nacelle is minimized. As a result, there may not be sufficient space between the fan case and the nacelle for mounting the tank. Additionally, geared turbofan engines may have an epicyclic (planetary) gearbox, which requires more oil than traditional turbofan engines, thus requiring a larger tank than a tank in turbofan engines without such a gearbox.

One interesting feature of the systems and methods described below may be that a tank may be mounted at or near a turbine section of the geared turbofan engine. Another interesting feature of the systems and methods described below may be that the tank may comprise a composite material, such as, for example, a ceramic matrix composite (CMC), carbon fiber, ceramic material, or other lightweight metal alloy, which may be lighter in weight than traditional materials such as aluminum and steel. The tank may be mounted at or near a core of the geared turbofan engine, aft of the fan. The core of the geared turbofan engine may be a zone extending from a compressor section to a turbine section. Alternatively or in addition, the core of the geared turbofan engine may refer to a compressor section, a combustor section, and a turbine section of the engine.

Although the tank material may be lighter weight than traditional metal alloys, the tank material may have decreased thermal capabilities compared to some metals. For example, the tank material may not dissipate heat as quickly as a metal. Positioning the tank at the turbine section or even anywhere near the core of the engine may expose the tank to higher temperatures than temperatures at or near the fan. Thus, another interesting feature of the systems and methods described below may be the inclusion of thermal breaks in combination with a metal mount and/or the use of a less thermally conductive mount material, which may overcome challenges resulting from including a tank comprising composite or other material not typically suited for the temperature environment near the core of the gas turbine engine. The thermal breaks may include less conductive materials, such as, for example, ceramic or other suitable thermal barrier coatings.

FIG. 1 is a cross-sectional view of a gas turbine engine 100. The gas turbine engine includes a fore end 101 and an aft end 103. The term fore, as used herein, refers to a position that is closer to the fore end 101 of the gas turbine engine 100. The term aft, as used herein, refers to a position that is closer to the aft end 103 of the gas turbine engine 100. In some examples, the gas turbine engine 100 may supply power to and/or provide propulsion for an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various examples. Though depicted as an axial flow engine, in some forms the gas turbine engine 100 may have multiple spools and/or may be a centrifugal or mixed centrifugal/axial flow engine. In some forms, the gas turbine engine 100 may be a turbofan, a geared turbofan, or a turboshaft engine. Furthermore, the gas turbine engine 100 may be an adaptive cycle and/or variable cycle engine. Other variations are also contemplated.

The gas turbine engine 100 may include an intake section 120, a compressor section 160, a combustion section 130, a turbine section 110, and an exhaust section 150. During operation of the gas turbine engine 100, fluid received from the intake section 120, such as air, travels along the direction D1 and may be compressed within the compressor section 160. The compressed fluid may then be mixed with fuel and the mixture may be burned in the combustion section 130. The combustion section 130 may include any suitable fuel injection and combustion mechanisms. The hot, high pressure fluid may then pass through the turbine section 110 to extract energy from the fluid and cause a turbine shaft of a turbine 114 in the turbine section 110 to rotate, which in turn drives the compressor section 160. Discharge fluid may exit the exhaust section 150.

As noted above, the hot, high pressure fluid passes through the turbine section 110 during operation of the gas turbine engine 100. As the fluid flows through the turbine section 110, the fluid passes between adjacent blades 112 of the turbine 114 causing the turbine 114 to rotate. The rotating turbine 114 may turn a shaft 140 in a rotational direction D2, for example. The blades 112 may rotate around an axis of rotation, which may correspond to a centerline X of the turbine 114 in some examples.

The gas turbine engine 100 may also include a fan 102 positioned fore of the compressor section 160. The fan 102 may receive fluid from the intake section 120 and direct it toward the aft end 103 of the gas turbine engine 100. A portion of the fluid passing through the fan 102 may enter the compressor section 160 while another portion of the fluid may bypass the compressor section 160. To better direct fluid passing through the fan 102, the fan 102 in FIG. 1 is surrounded by a nacelle 104. The nacelle 104 may be a housing for the gas turbine engine 100. Examples of the nacelle 104 may include a duct or a substantially cylindrical shell. The nacelle 104 may extend over other portions of the gas turbine engine 100, such as the compressor section 160 and the turbine section 110.

The fan 102 may be coupled to the shaft 140 through a power gearbox 106. The power gearbox 106 may be any component which mechanically transforms rotations D2 of the shaft 140 into rotations of the fan 102. Examples of the power gearbox 106 may include a coaxial helical inline gearbox, a bevel helical gearbox, or a planetary gearbox (also known as an epicyclic gear train). The fan 102, the nacelle 104, and the power gearbox 106, may be supported by struts 108 coupled to different points of the gas turbine engine 100. For example, as illustrated in FIG. 1, the struts 108 may extend between the power gearbox 106 and the nacelle 104, and between the nacelle 104 and the compressor section 160. The struts 108 may extend between other portions of the gas turbine engine 100 as well. In other examples, when the gas turbine engine 100 is a turbofan, the fan 102 may be directly coupled to the shaft 140 without the power gearbox 106.

In FIG. 1, the power gearbox 106 is lubricated by a primary lubrication system 122, which includes a primary pump 124, a sump 126, a primary supply line 128, and a primary return line 129. The primary lubrication system 122 may be any system that circulates a lubricant, such as oil, through the power gearbox 106.

The primary pump 124 may be coupled to a portion of the gas turbine engine 100 and the sump 126 may be positioned in the power gearbox 106. The sump 126 may be any space within the power gearbox 106 which is spaced apart from and directly beneath gears of the power gearbox 106. Although the sump 126 is in the power gearbox 106, which may be considered a separate component from the primary lubrication system 122, the sump 126 may be a collection point for lubricant and is logically considered part of the primary lubrication system 122. The lubricant may be any fluid, such as oil, capable of reducing frictional interaction between mechanical components, such as gears. The lubricant may also be any fluid which cools the mechanical components. The primary pump 124 may draw lubricant from a tank (further discussed with reference to FIG. 2 herein) to deliver lubricant to the power gearbox 106. Examples of the primary pump 124 may include a fixed displacement pump or a variable displacement pump, such as a rotary vane pump, a piston pump, or a centrifugal pump.

The primary pump 124 may deliver lubricant to the power gearbox 106 through the primary supply line 128. The primary supply line 128 may be any structure configured to transport lubricant, such as a tube, a pipe, or a vessel. The primary pump 124 may be powered by the shaft 140 of the gas turbine engine 100. Lubricant may return to the primary pump 124 from the power gearbox 106 through a primary return line 129. The primary return line 129 may be any structure configured to transport lubricant, such as a tube, a pipe, or a vessel. Both the primary return line 129 and the primary supply line 128 may pass through the struts 108 in order for the tank 202 to be in fluid communication with the power gearbox 106. In some examples, the primary pump 124 may be a pump assembly including multiple pumping elements configured to pump lubricant from the tank to various components of the gas turbine engine 100. The pump assembly may be further configured to pump lubricant from sumps of respective components through the oil scavenge line 207 to the primary pump 124 and to the tank 202 from the primary pump 124.

The gas turbine engine 100 may further include an oil delivery system 200. The oil delivery system 200 is described with further reference to FIGS. 2 and 3.

Figure 2:
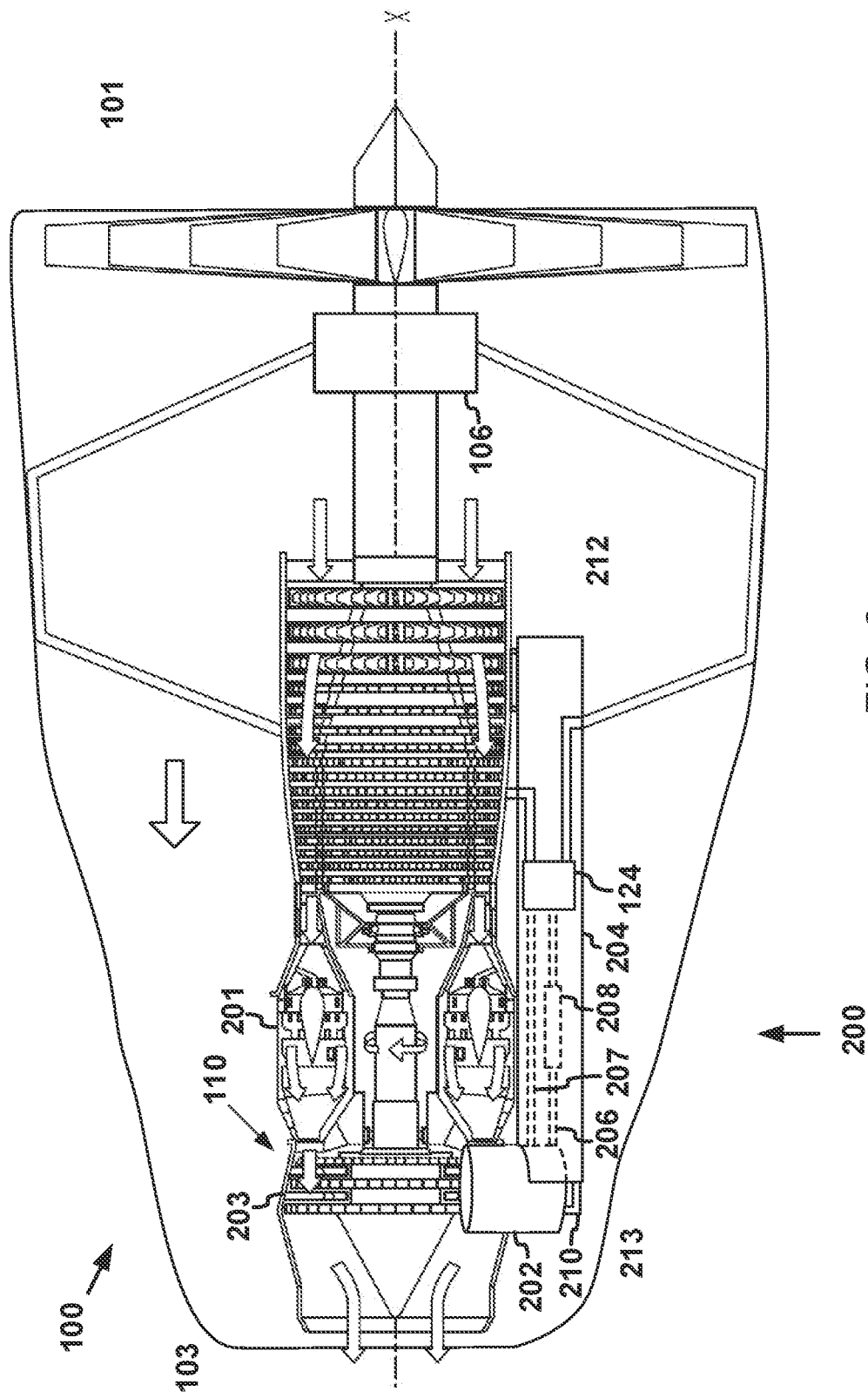
FIG. 2 schematically illustrates an example of an oil delivery system for a gas turbine engine.

FIG. 2 schematically illustrates an example of the oil delivery system 200 in an example of the gas turbine engine 100. The oil delivery system 200 may include a tank 202, an accessory gearbox 204, an oil feed line 206, an oil scavenge line 207, a heat exchanger 208, and an accessory oil feed line 210. The oil feed line 206 extends between the tank 202 and the primary lubrication system 122. The oil feed line 206 passes through the heat exchanger 208. The accessory oil feed line 210 extends between the tank 202 and the accessory gearbox 204. The oil delivery system 200 may be any system configured to provide lubricant, such as oil, to the primary lubrication system 122, the power gearbox 106, and/or the accessory gearbox 204.

The tank 202 may be any tank for containing or storing oil or any other substance for lubricating and/or cooling components of the gas turbine engine 100. The tank 202 may include an inlet for receiving oil and an outlet for transferring oil out of the tank 202. For example, the tank 202 may couple to the oil feed line 206, which transfers oil from the tank 202 to the primary pump 124, and to the accessory oil feed line 210, which conducts oil from the tank 202 to the accessory gearbox 204.

The tank 202 may be positioned radially outward from the core of the gas turbine engine 200 in the bypass air duct 116 between the nacelle 104 and an engine casing 201 enclosing the compressor section 160, the combustion section 130, and/or the turbine section 110. For example, the tank 202 may be mounted to the core of the gas turbine engine 100. The core is a central zone of the gas turbine engine 100 including the compressor section 160, the combustion section 130, and the turbine section 110.

In some examples, as shown in FIG. 2, the tank 202 may be mounted at or near the turbine section 110 of the gas turbine engine 100. The tank 202 may be mounted to a casing 203 of the turbine section 110. In other examples, the tank 202 is mounted to the nacelle 104 or a bypass air duct 116 between the casing of the compressor section 160, combustion section 130, and/or the turbine section 110 and the nacelle 104. By mounting the tank 202 to the nacelle 104 and/or the bypass air duct 116, thermal conduction through the mounts may be less than when the tank is mounted to a casing of the compressor section 160, combustion section 130, and/or the turbine section 110. In other examples, the tank 202 may be mounted to power gearbox 106 via a long mount, which may position the tank 202 radially outward from the core of the gas turbine engine 100. A mount for the tank 202 is hidden from view in FIG. 2 and will be described in more detail herein with reference to FIGS. 3A and 3B.

The bypass air duct 116 may be any duct positioned around a periphery of the gas turbine engine 100 that is configured to receive a portion of the air from the intake section 120. The bypass air duct 116 directs the air past the periphery of the gas turbine engine 100 in direction D3, such that the air bypasses the core of the gas turbine engine 100. In some examples, the bypass air duct may include one or more louvres positioned in the bypass air duct. The louvres may be configured to direct at least a portion of bypass air to flow across the tank 202, thus cooling the tank 202.

The oil feed line 206 may be any structure configured to transport lubricant, such as a tube, a pipe, or a vessel. The oil feed line 206 may be configured to transport the lubricant from the tank 202 to the primary pump 124 and from the primary pump 124 to the power gearbox 106. The primary pump 124 may be positioned in the core of the gas turbine engine 100 and mounted to the accessory gearbox 204. The oil scavenge line 207 may be any structure configured to transport lubricant, such as a tube, a pipe, or a vessel. The oil scavenge line 207 may be configured to transport the lubricant from the primary pump 124 to the tank 202. Because the tank 202 is also mounted to the core of the gas turbine engine, for example at the turbine section 110, a length of the oil feed line 206 and/or the oil scavenge line 207 in the current system may be less than a length of an oil feed line and/or oil scavenge line 207 in a typical gas turbine engine where the tank 202 is mounted toward the front of the gas turbine engine near the fan. For example, the oil feed line 206 and the oil scavenge line 207 in the present system may be between 20-30 feet shorter than an oil feed line in a system where the tank 202 is mounted near the fan. In some examples, a length of the oil feed line 206, the oil scavenge line 207, or combination thereof may be reduced by up to fifty percent when compared to traditional system.

Thus, there are weight savings from the reduction in piping required for the oil feed line 206. There are additional weight savings due to the lower amount of oil needed to fill the shorter oil feed line 206. A benefit of reducing the amount of oil in the oil feed line 206 is that the amount of oil system gulp, which is the amount of oil active in the system at any one point during operation, may be reduced. If oil system gulp is reduced, an overall volume of the tank 202 may be reduced, thus further reducing the weight of the tank 202.

In other words, the tank 202 may be positioned in the core of the gas turbine engine 100, such that a distance between the tank 202 and the primary pump 124 is less than a distance between the tank 202 and primary pump 124 if the tank 202 were positioned near the fan 102 and/or the power gearbox 106.

The accessory gearbox 204, may be any component which houses an accessory geartrain that mechanically drives accessory components, which may include, for example, oil pumps, fuel pumps, alternators, and/or generators. Each accessory component may be mounted to the accessory gearbox 204 and may be driven by corresponding gear in the accessory geartrain. The accessory gearbox 204 may have a fore end 212 and an aft end 213. As shown in FIG. 2, the primary pump 124 is mounted to the accessory gearbox 204 and may be driven by the accessory gearbox 204. The primary pump 124 may be positioned near the fore end 212 of the accessory gearbox 204. In some examples, as shown in FIG. 2 the accessory gearbox 204 may be an axial gearbox extending longitudinally along a length of the gas turbine engine and substantially parallel to the centerline X. In this example, the accessory gearbox is mounted at the core of the gas turbine engine 100. In other examples, the accessory gearbox 204 may be a trans-axial gearbox positioned to wrap radially around a portion of the gas turbine engine 100. In addition, the accessory gearbox 204 may include a secondary lubrication system that is configured to provide lubricant to the accessory gearbox 204.

The accessory oil feed line 210 may be any structure configured to transport lubricant, such as a tube, a pipe, or a vessel. The accessory oil feed line 210 may be configured to transport the lubricant from the tank 202 to the primary pump 124 and from the primary pump 124 to the accessory gearbox 204 for the lubrication and/or cooling of the components of the accessory gearbox 204.

The heat exchanger 208 may be any device configured to transfer heat between the heat exchanger 208 and the lubricant. The heat exchanger 208 may be positioned along the oil feed line 206 and/or the accessory oil feed line 210. In some examples, the heat exchanger 208 removes heat from the lubricant exiting the tank 202.

Figure 3A:
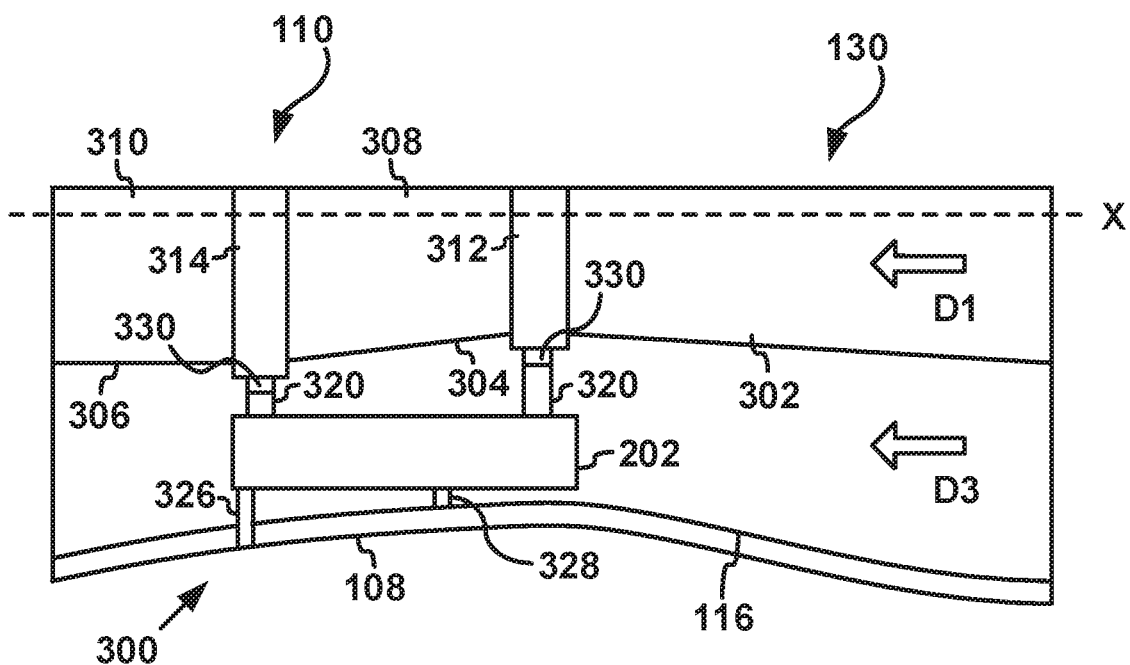
FIG. 3A illustrates a partial axial cross-section of a gas turbine engine having a thermal management system.
Figure 3B:
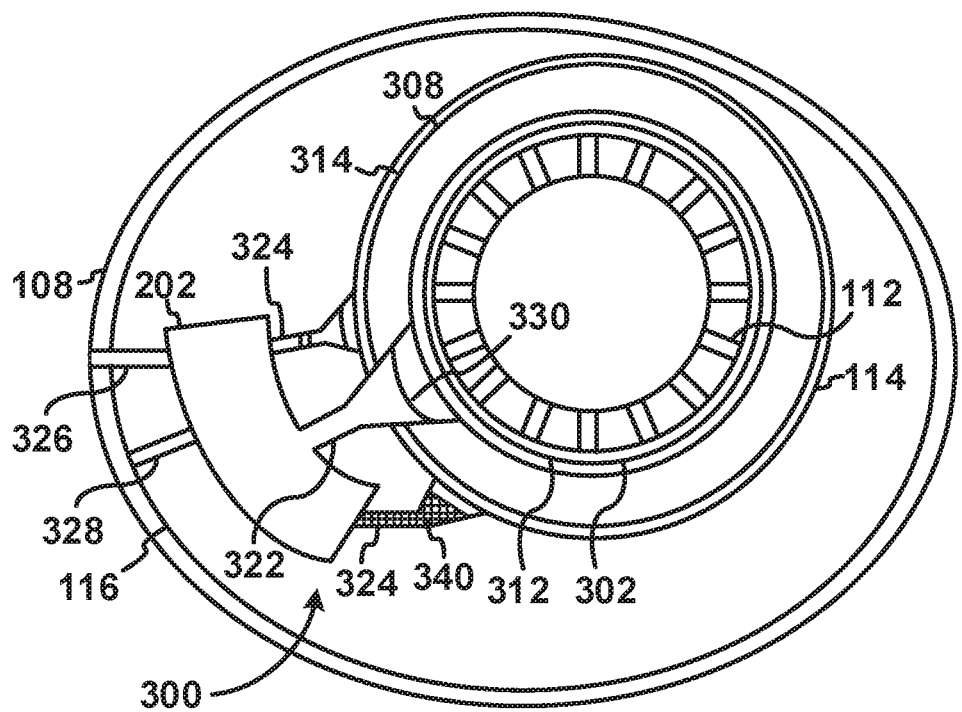
FIG. 3B illustrates a radial cross-section of the gas turbine engine shown in FIG. 3A.

FIGS. 3A and 3B show an example of a portion of the core of the gas turbine engine 100, which illustrates a thermal management system 300 for mounting the tank 202. FIG. 3A shows a half side view of half of the turbine section 110 and the combustion section 130 of the gas turbine engine 100. FIG. 3B shows a cross-sectional view of the gas turbine engine. In this example, the thermal management system 300 includes the combustion section 130 and the turbine section 110, which are coupled, joined, and/or integrally formed together via a first flange 312 and a second flange 314, which are positioned between adjoining sections.

The combustion section 130 includes a combustion chamber outer casing 302 (CCOC), which houses the combustion chamber. The CCOC 302 may be shell that is configured to contain and withstand the combustion of the gas turbine engine 100.

The turbine section 110 may include, in some examples, a high pressure turbine 304 (HPT), an intermediate pressure turbine 306 (IPT), and a low pressure turbine (not shown). In other examples, the turbine section 110 may include only the high pressure turbine 304 and the low pressure turbine. As shown in FIG. 3A, the IPT 306 is positioned aft of the HPT 304 relative to a primary flow path D1 of the gas turbine engine 100. During operation, the HPT 304 may experience higher pressures than the IPT 306. The HPT 304 includes an HPT casing 308, which surrounds and houses the components of the HPT 304, and the IPT 306 includes an IPT casing 310, which surrounds and houses the components of the IPT 306.

The HPT casing 308 may be any structure that surrounds the HPT 304, and which is configured to withstand the temperature and pressure conditions therein.

The IPT casing 310 may be any structure that surrounds the IPT 306, and which is configured to withstand the temperature and pressure conditions therein.

The first flange 312 may be any structure extending from the core of the gas turbine engine 100, which defines an attachment surface for the tank 202. The first flange 312 may be positioned between the CCOC 302 and the HPT casing 308. In some examples, the first flange 312 may be integrally formed with the CCOC 302 and/or the HPT casing 308. In other examples, the first flange 312 is coupled to the CCOC 302 and/or the HPT casing 308. Examples of the first flange 312 may include an external ridge or rim extending radially outward from the HPT casing 308 and/or the CCOC 302. As shown in FIG. 3A, The second flange 314 may be any structure extending from the core of the gas turbine engine 100, which defines an attachment surface for the tank 202. The second flange 314 may be positioned between the HPT casing 308 and the IPT casing 310. In some examples the first flange 312 may be integrally formed with the IPT casing 310 and/or the HPT casing 308. In other examples, the second flange 314 is coupled to the IPT casing 310 and/or the HPT casing 308. Examples of the second flange 314 may include an external ridge or rim extending radially outward from the HPT casing 308 and/or the IPT casing 310. Alternatively or in addition, the first flange 312 and/or the second flange 314 may be single annular pieces that are positionable between respective sections of the gas turbine engine 100. Although described with reference to the HPT and IPT, the tank 202 may be similarly mounted to the low pressure turbine, which is positioned aft of the IPT, alone or in combination with other portions of the turbine section 110, compressor section 160, and/or the combustor section 130.

As shown in FIGS. 3A and 3B, the tank 202 may include one or more mounts 320. The mounts 320 may be any structure that attaches the tank 202 to the gas turbine engine 100. The mounts 320 may include a first set 322 and a second set 324 or more. The first set 322 of mounts 320 may include one or more mounts. The first set 322 of the mounts 320 may be coupled to the tank 202 at a first, radially outer end and the first flange 312 at the second, radially inner end. The second set 324 of the mounts 320 may be coupled to the tank 202 at a first end and the second flange 314 at a second end.

In an example, the mounts 320 may comprise a metallic material, such as steel or aluminum. Because metal materials are good conductors of heat, an undesirable amount of heat may be transferred from the CCOC 302, the HPT casing 308, and/or the IPT casing 310 to the tank 202 during operation of the gas turbine engine 100. In some examples, as shown in FIGS. 3A and 3B, the mounts 320 include one or more thermal breaks 330. The thermal breaks 330 may be a portion of the mount 320 that comprises a ceramic material or other suitable material may not conduct heat as well as the metallic material. Thus, the thermal breaks 330 may limit and/or prevent the transfer of heat through the mounts 320. Alternatively or in addition, the mounts 320 may include a thermal coating, such as fiberglass, thermal spray oxide, silicone, or ceramic coatings, which may reduce the transfer of heat through the mounts 320.

In another example, a length of the mounts 320 may be increased to position the tank 202 further from the CCOC 302, HPT casing 308, and/or IPT casing 310 and nearer the nacelle 104. By increasing the length of the mounts 320, thermal conduction from the casings 302, 308, 310, to the tank 202 may be decreased.

Alternatively or in addition, the mounts 320 may include a third set 326. The third set 326 may include one more mounts 320. The third set 326 may be coupled to the tank 202 at a first end and the nacelle 104 at a second end. In some examples, the tank 202 may include the third set 326 instead of the first set 322 and the second set 324. In this example, less heat may be transferred through the mounts 320, because the nacelle 104 and the bypass air duct 116 may be at a lower temperature than the CCOC 302, the HPT casing 308, or the IPT casing 310.

Alternatively or in addition, the mounts 320 may include a mount heat exchanger 340. The mount heat exchanger 340 may be any structure on the mounts 320 which is configured to transfer heat from the mounts 320 to the bypass air (D3) passing over the mounts 320 during operation. The mount heat exchanger 340 may increase the surface area of the mounts 320, such that the bypass air contacts a larger area of the mounts 320 and therefore may remove additional heat. Examples of the mount heat exchanger 340 may include a heat sink, a cooling pin, a cooling fin, and/or a turbulator (shown schematically in FIG. 3B).

Figure 4:
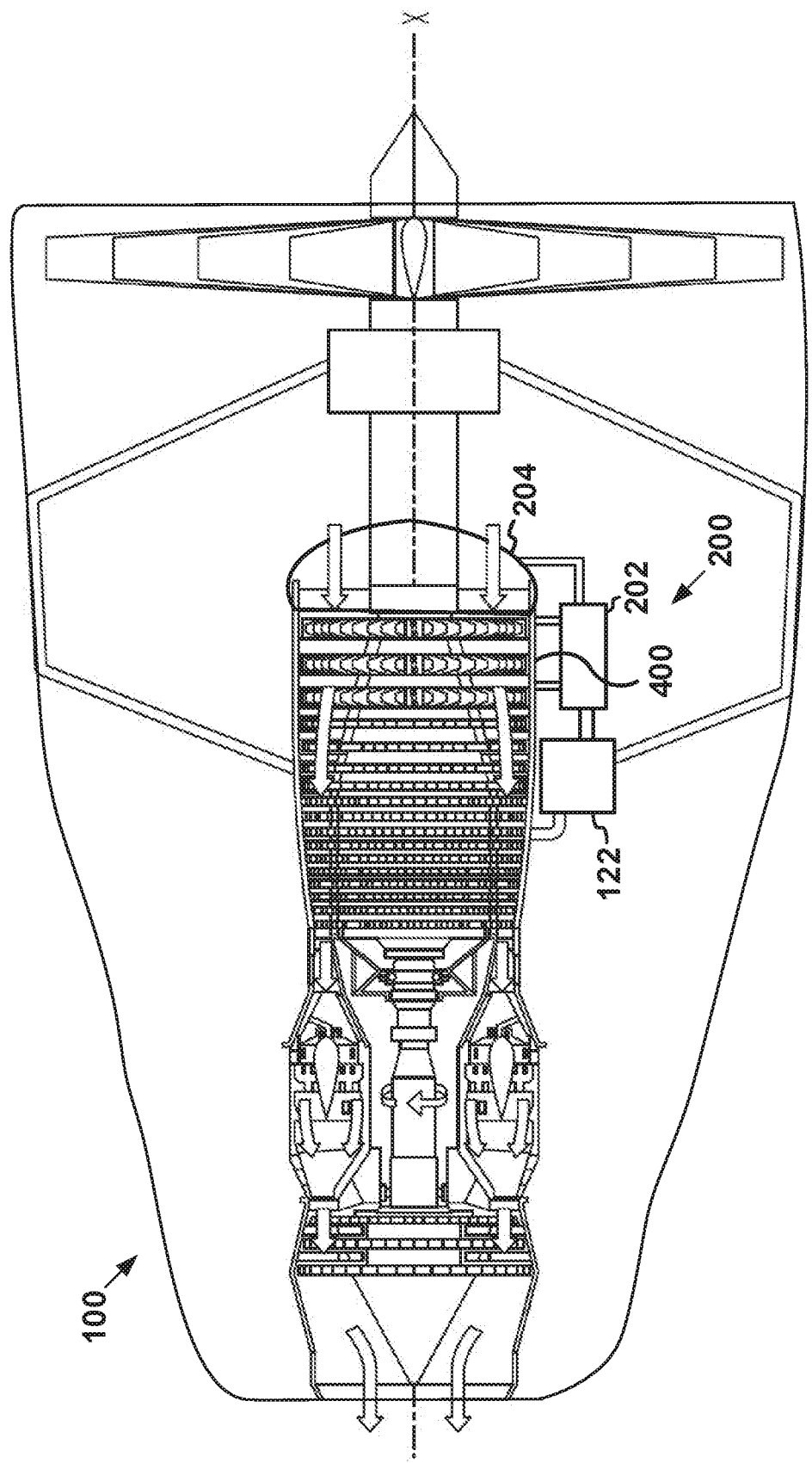
FIG. 4 schematically illustrates an example of an oil delivery system for a gas turbine engine.

FIG. 4 illustrates an example of the oil delivery system 200 in which the accessory gearbox 204 is a trans-axial gearbox positioned near the compressor section 160. In this example, the tank 202 is mounted to the compressor casing 400. The compressor casing 400 may be any structure which surrounds and/or houses the compressor 402. In this example, because the compressor section is at a lower temperature than other sections, such as the combustion section and/or the turbine section, less heat is transferred through the mounts 320 to the tank 202.

Figure 6:
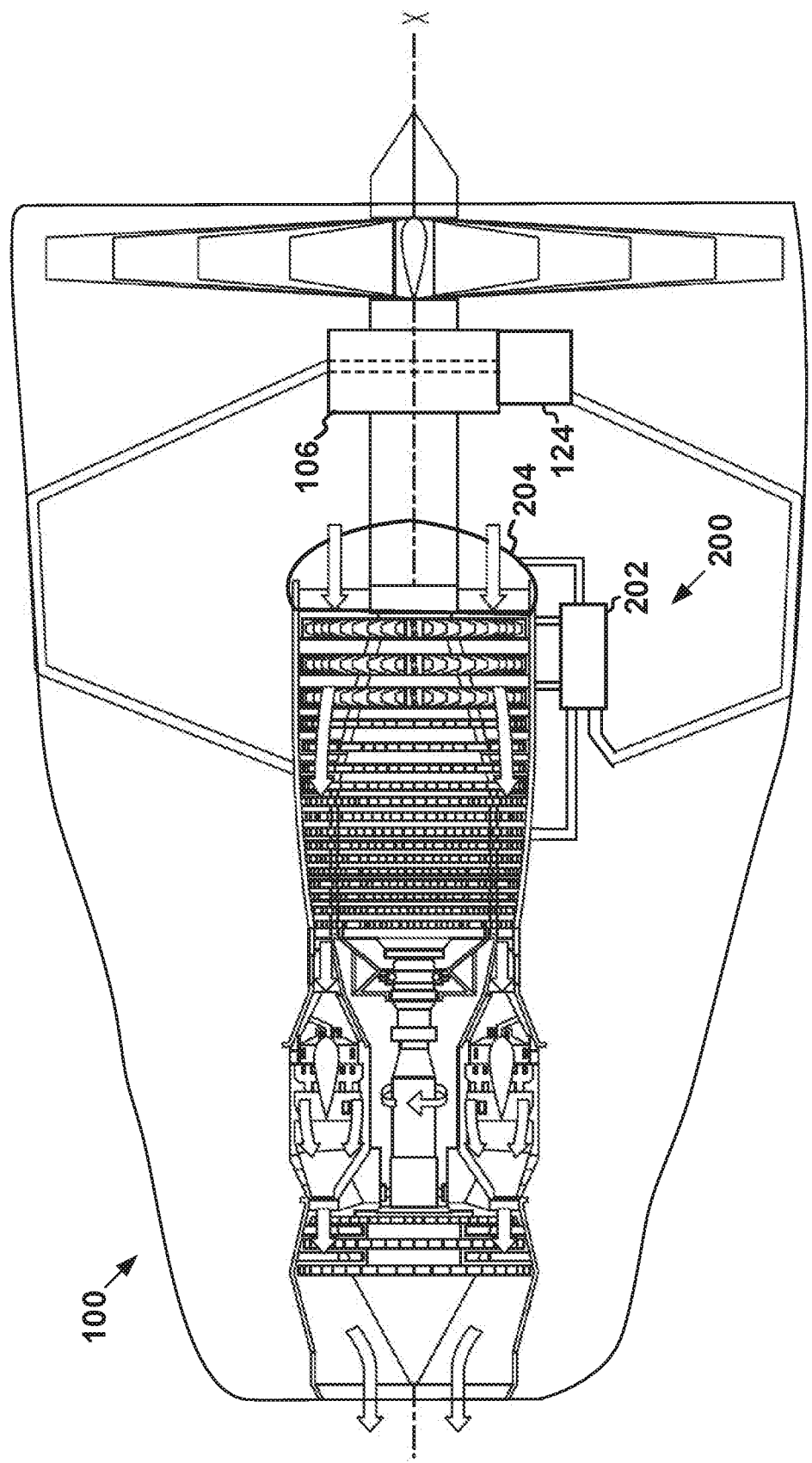
FIG. 6 schematically illustrates an example of an oil delivery system in which a primary pump is mounted to and mechanically driven by a power gearbox.

FIG. 6 illustrates an example of the oil delivery system 200 in which the primary pump 124 is mounted and mechanically driven by power gearbox 106.

Each component may include additional, different, or fewer components. For example, the oil delivery system 200 may include only the tank 202, the oil feed line 206, and the mounts 320.

In an example, the oil delivery system 200 may include a feed line configured to spray a cooling fluid, such as oil, onto internal tank surfaces corresponding to the mounts 320. In this example, the feed line may further include the heat exchanger 208 configured to remove heat from lubricant and/or cooling fluid before spraying the cooling fluid onto the internal surfaces of the tank 202. Alternatively or in addition, the oil delivery system 200 may be configured to spray the cooling fluid onto the mounts 320 and/or the tank 202.

The tank 202, may weigh 40% to 50% than a similarly sized tank comprising traditional metallic material, such as steel or aluminum.

The thermal management system 300 may include a heat shield positioned between a casing where the tank 202 is mounted and the tank 202. The heat shield may be configured to prevent and/or limit radiant heat from the compressor section 160, the combustor section 130, and/or the turbine section 110 from being transferred to the tank 202.

The primary pump 124 may be driven by components other than the power gearbox 106 and/or the accessory gearbox 204, such as by electric motors, hydraulic impellers, and/or pneumatic impellers.

In an example, the mounts 320 may include a predetermined number of thermal breaks 330, coatings, and/or be mounted a extend a predetermined distances from the combustion and turbine casings, such that a temperature of the mounts 320 is less than the mounts 320 allowable thermal limit and/or the tank 202 is less than the allowable thermal limit of the tank 202. The mounts 320 may further include brackets and/or spherical bearings. The brackets and/or the spherical bearings may include a ceramic or other thermal material.

In an example, the tank 202 may include one or more of the first set 322, the second set 324, the third set 326, or the fourth set 328 of the mounts 320 or any combination thereof.

Figure 5:
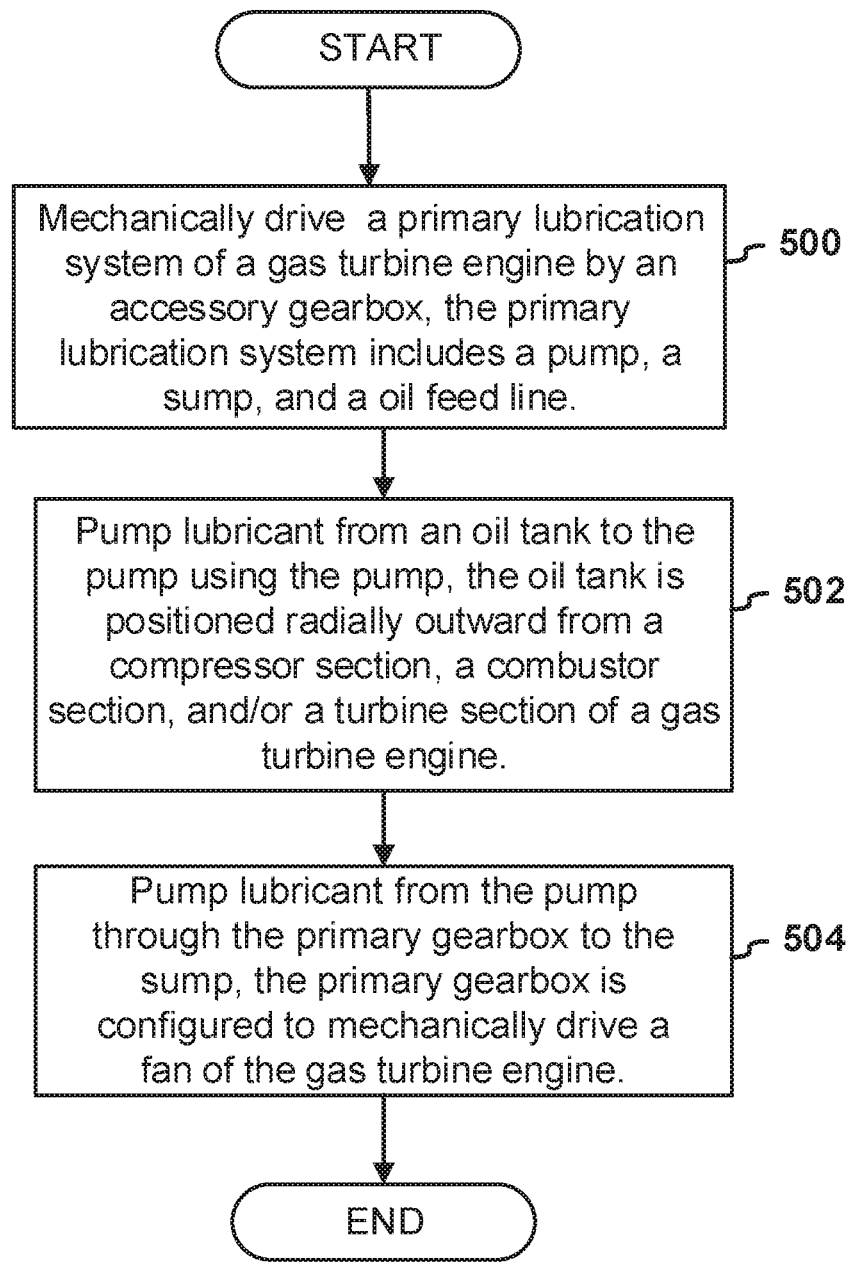
FIG. 5 illustrates a flow diagram of an example of a method of supplying lubricant to a gearbox.

FIG. 5 illustrates a flow diagram of an example of steps to deliver lubricant, such as oil, from the tank 202 to the power gearbox 106. The primary lubrication system 122 is mechanically driven by the accessory gearbox 204 (500). The primary lubrication system 122 includes the primary pump 124, the sump 126 of the power gearbox 106, and the oil feed line 206. The accessory gearbox 204 mechanically drives the primary pump 124 of the primary lubrication system 122. Lubricant/coolant, such as oil, is pumped by the primary pump 124 from the tank 202 to the primary pump 124 (502). The primary pump 124 may cause the lubricant to travel through the oil feed line 206 from the tank 202 to the primary pump 124. The tank may be positioned radially outward from a compressor section, a combustor section, and/or turbine section of the gas turbine engine. The lubricant/coolant is pumped from the primary pump 124 through the power gearbox 106 to the sump 126 of the power gearbox 106 (504). The power gearbox is configured to mechanically drive the fan 102 of the gas turbine engine 100.

The method may include additional, different, or fewer operations than illustrated in FIG. 5. The steps may be executed in a different order than illustrated in FIG. 5. For example, the method may include passing the lubricant through the heat exchanger to remove heat from the lubricant.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to an oil delivery system comprising: a tank for a gas turbine engine, the tank configured to store oil for the gas turbine engine, wherein the tank is mounted to a compressor section, a combustor section, and/or a turbine section of the gas turbine engine; and a primary lubrication system including a pump and an oil feed line extending from the tank to a power gearbox, the pump configured to pump a flow of oil from the tank through the oil feed line to the power gearbox.

A second aspect relates to the system of aspect 1, further comprising a mount extending from the tank to the compressor section, the combustor section, and/or the turbine section, wherein the mount is coupled to the tank at one end of the mount, and wherein the mount is coupled to the compressor section, the combustor section, and/or the turbine section at an opposite end of the mount.

A third aspect relates to the system of any preceding aspect, wherein the turbine section comprises a high pressure turbine casing and an intermediate pressure turbine casing positioned aft of the high pressure turbine casing, the oil delivery system further comprising a first flange between a combustion casing and the high pressure turbine casing and a second flange between the high pressure turbine casing and the intermediate pressure turbine casing, wherein the mount further comprises a first mount and a second mount, wherein the first mount is coupled to the first flange and the second mount is coupled to the second flange.

A fourth aspect relates to the system of any preceding aspect, wherein the mount comprises metal and wherein the mount includes a thermal break positioned between the mount and the compressor section, the combustor section, and/or the turbine section.

A fifth aspect relates to the system of any preceding aspect, further comprising a heat exchanger positioned on the mount.

A sixth aspect relates to the system of any preceding aspect, wherein the primary lubrication system is configured to provide oil to a power gearbox of the gas turbine engine, the power gearbox configured to mechanically drive a fan of the gas turbine engine.

A seventh aspect relates to the system of any preceding aspect, wherein the power gearbox is positioned fore of the compressor section relative to a primary flow path of the gas turbine engine.

An eighth aspect relates to the system of any preceding aspect, wherein the power gearbox is a planetary gearbox.

A ninth aspect relates to the system of any preceding aspect, further comprising an accessory gearbox having a fore end and an aft end and an accessory oil feed line extending between the tank and the accessory gearbox, wherein the tank is positioned at the aft end of the accessory gearbox, wherein the accessory oil feed line is configured conduct the flow of oil from the tank to the accessory gearbox, wherein the accessory gearbox is configured to drive the pump.

A tenth aspect relates to the system of any preceding aspect, wherein the primary lubrication system is mounted to the accessory gearbox at the fore end of the accessory gearbox.

An eleventh aspect relates to a thermal management system comprising: a tank; and a mount having a first end and a second end, wherein the tank is attached to the mount at the first end of the mount, wherein the second end of the mount is attached to a portion of a gas turbine engine, such that the tank is positioned radially outward from a compressor section, a combustor section, and/or a turbine section of a gas turbine engine.

A twelfth aspect relates to the system of any preceding aspect, wherein the portion of the gas turbine engine is a turbine casing of the gas turbine engine.

A thirteenth aspect relates to the system of any preceding aspect, wherein the portion of the gas turbine engine is a bypass air duct of the gas turbine engine.

A fourteenth aspect relates to the system of any preceding aspect, wherein the portion of the gas turbine engine is a nacelle of the gas turbine engine.

A fifteenth aspect relates to the system of any preceding aspect, further comprising a thermal break positioned at the first end of the mount between the mount and the tank.

A sixteenth aspect relates to the system of any preceding aspect, wherein the mount further comprises a thermal coating configured to reduce thermal conductivity of the mount.

A seventeenth aspect relates to the system of any preceding aspect, further comprising an oil delivery system comprising: the tank; a primary lubrication system including a pump, a sump of a power gearbox, and an oil feed line extending from the tank to the sump of the power gearbox, wherein the pump is configured to pump oil through the oil feed line from the tank to the sump of the power gearbox; and an accessory gearbox coupled to the primary lubrication system, wherein the accessory gearbox is configured to mechanically drive the pump to cause oil to be transported from the tank to the power gearbox.

An eighteenth aspect relates to the system of any preceding aspect, wherein the oil feed line is configured to spray the oil onto a surface of the mount and/or the tank.

A nineteenth aspect relates to the system of any preceding aspect, wherein the accessory gearbox is a trans-axial gearbox positioned at fore end of the combustor section of the gas turbine engine, wherein the tank is mounted to the combustor section of the gas turbine engine.

A twentieth aspect relates to a method comprising: mechanically driving a primary lubrication system for a gas turbine engine, by an accessory gearbox, wherein the primary lubrication system includes a pump, a sump of a power gearbox, and an oil feed line, wherein the accessory gearbox mechanically drives the pump of the primary lubrication system; pumping oil from a tank to the pump with the pump, wherein the pump causes the oil to travel through the oil feed line from the tank to the pump, wherein the tank is positioned radially outward from a compressor section, a combustor section, and/or turbine section of the gas turbine engine; and pumping oil from the pump through the power gearbox to the sump of the power gearbox, the power gearbox configured to mechanically drive a fan of the gas turbine engine.

In addition to the features mentioned in each of the independent aspects enumerated above, some examples may show, alone or in combination, the optional features mentioned in the dependent aspects and/or as disclosed in the description above and shown in the figures.

What is claimed is:

1. An oil delivery system comprising:
    a tank for a gas turbine engine, the tank configured to store oil for the gas turbine engine, wherein the tank is positioned radially outward from a compressor section, a combustor section, and/or a turbine section of the gas turbine engine;
    a primary lubrication system including a pump and an oil feed line extending from the tank to a power gearbox, the pump configured to pump a flow of oil from the tank through the oil feed line to the power gearbox; and
    an accessory gearbox configured to drive the pump, wherein a portion of the tank is positioned aft of the accessory gearbox
    an accessory oil feed line extending between the tank and the accessory gearbox, wherein the accessory oil feed line is configured to conduct the flow of oil from the tank to the accessory gearbox, and
    wherein the primary lubrication system is mounted to the accessory gearbox fore of the tank.

2. The oil delivery system of claim 1, further comprising a mount extending from the tank to the compressor section, the combustor section, and/or the turbine section, wherein the mount is coupled to the tank at one end of the mount, and wherein the mount is coupled to the compressor section, the combustor section, and/or the turbine section at an opposite end of the mount.

3. The oil delivery system of claim 2, wherein the turbine section comprises a high pressure turbine casing and an intermediate pressure turbine casing positioned aft of the high pressure turbine casing, the oil delivery system further comprising a first flange between a combustion casing and the high pressure turbine casing and a second flange between the high pressure turbine casing and the intermediate pressure turbine casing, wherein the mount further comprises a first mount and a second mount, wherein the first mount is coupled to the first flange and the second mount is coupled to the second flange.

4. The oil delivery system of claim 2, wherein the mount comprises metal and wherein the mount includes a thermal break positioned between the mount and the compressor section, the combustor section, and/or the turbine section.

5. The oil delivery system of claim 2, further comprising a heat exchanger positioned on the mount.

6. The oil delivery system of claim 1, wherein the primary lubrication system is configured to provide oil to the power gearbox of the gas turbine engine, the power gearbox configured to mechanically drive a fan of the gas turbine engine.

7. The oil delivery system of claim 6, wherein the power gearbox is positioned fore of the compressor section relative to a primary flow path of the gas turbine engine.

8. The oil delivery system of claim 6, wherein the power gearbox is a planetary gearbox.

9. A method of oil delivery, the method comprising:
    storing oil in a tank positioned radially outward from a compressor section, a combustor section, and/or a turbine section of a gas turbine engine;
    pumping, with a pump of a primary lubrication system, a flow of oil from the tank through an oil feed line to a power gearbox; and
    driving the pump with an accessory gearbox, wherein the primary lubrication system is mounted to the accessory gearbox fore of the tank, and wherein a portion of the tank is positioned aft of the accessory gearbox; and
    conducting, with an accessory oil feed line, the flow of oil from the tank to the accessory gearbox.

10. The method of claim 9, further comprising:
    mechanically driving, with the power gearbox, a fan of the gas turbine engine.

11. The method of claim 10, wherein the power gearbox is positioned fore of the compressor section relative to a primary flow path of the gas turbine engine.

12. The method of claim 10, wherein the power gearbox is a planetary gearbox.

* * * * *